United States Patent [19]
Arai et al.

[11] 4,092,471
[45] May 30, 1978

[54] METHOD FOR REMOVING UNREACTED MONOMERS FROM AQUEOUS DISPERSIONS OF POLYMERIZATE

[75] Inventors: Shigeru Arai, Yachiyo; Kenichi Ito, Ibaragi; Kinya Ogawa, Ibaragi; Kazuhiko Kurimoto, Ibaragi; Yoshihiro Shirota, Ibaragi, all of Japan

[73] Assignee: Shin-Etsu Chemical Co., Ltd., Tokyo, Japan

[21] Appl. No.: 620,819

[22] Filed: Oct. 8, 1975

[30] Foreign Application Priority Data

Oct. 19, 1974 Japan .................. 49-120494

[51] Int. Cl.$^2$ .................. C08F 6/16; C08F 6/10; C08F 6/24
[52] U.S. Cl. .................. 528/502; 260/29.6 PT; 526/344; 528/503
[58] Field of Search .................. 526/67, 88; 260/29.6 PT, 29.6 R; 528/502, 503

[56] References Cited

U.S. PATENT DOCUMENTS

| | | | |
|---|---|---|---|
| 3,004,013 | 10/1961 | Kircher | 526/202 |
| 3,105,065 | 9/1963 | Fujii | 526/67 X |
| 3,317,449 | 5/1967 | Isaacs | 526/343 X |
| 3,678,021 | 7/1972 | Chatelain | 526/344 X |
| 3,793,259 | 2/1974 | Brinkmann | 526/344 X |

OTHER PUBLICATIONS

Chem. Abst. 67(1967), 100680y.

*Primary Examiner*—Christopher A. Henderson, Jr.
*Attorney, Agent, or Firm*—Bierman & Bierman

[57] ABSTRACT

Unreacted monomer or monomers and any other volatile organic compounds contained in an aqueous dispersion of polymerizate are removed or separated by a method comprising circulating the aqueous polymerizate dispersion from the bottom of its container to the upper part of the container located over the surface of the dispersion via an exterior conduit. The pressure in the container is maintained at a level reduced to about the saturated vapor pressure of water at the temperature of the dispersion. This manner of separation of monomer from polymer serves to improve the working environment as well as the resulting polymer quality, and the monomer or monomers thus recoverd can be advantageously recycled.

4 Claims, 1 Drawing Figure

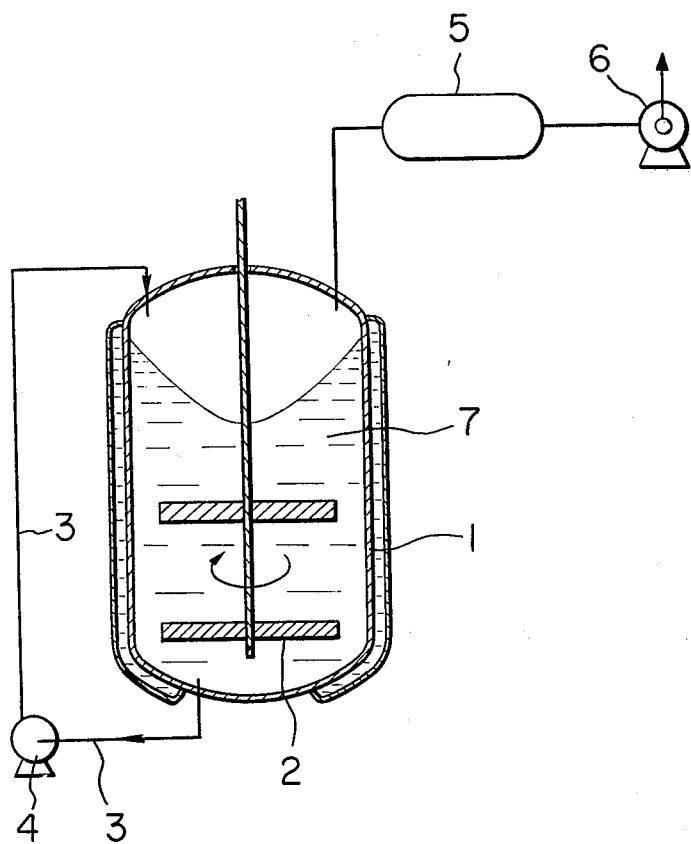

METHOD FOR REMOVING UNREACTED MONOMERS FROM AQUEOUS DISPERSIONS OF POLYMERIZATE

FIELD OF THE INVENTION

This invention relates to an improved method for removing essentially all unreacted monomer or monomers and other volatile organic compounds contained in a dispersion of a polymerizate in an aqueous medium produced particularly by the suspension or emulsion polymerization of vinyl chloride or vinylidene chloride or a mixture thereof with a copolymerizable monomer or monomers from the aqueous polymerizate dispersion.

DESCRIPTION OF THE PRIOR ART

Hitherto, it has been known to remove unreacted vinyl chloride or vinylidene chloride monomer or monomers and any other volatile organic compounds from a polymerizate dispersion produced by the suspension or emulsion polymerization or copolymerization of the monomer or monomers frm the polymerizate dispersion. This has been accomplished by heating it and/or by subjecting it to reduced pressure in the polymerization reactor or in a dump tank into which the polymerizate dispersion is discharged from the polymerization reactor. However, such treatment of the polymerizate dispersion has been found insufficient to satisfactorily strip the monomers. In particular, when a very large reactor is employed, as has recently been used in vinyl chloride polymerization by the suspension process, it has been difficult to sufficiently separate the monomers from the whole slurry. It has been particularly difficult to separate the monomers at the lower part of the reactor even though an agitator is operated within the reactor.

If the intended removal of the unreacted monomers and other volatile organic compounds from the polymerizate dispersion is undertaken only by heating and/or subjecting it to reduced pressure as described above, then the elevated temperature and/or reduced pressure must be maintained over a considerably long period of time. This results in the possibility of product degradation or decomposition as well as lowered production efficiency.

OBJECTS OF THE INVENTION

It is an object of this invention to provide a method for the efficient removal and recovery of unreacted monomer or monomers and any other volatile organic compounds from an aqueous dispersion of polymerizate within a short period of time.

SUMMARY OF THE INVENTION

In accordance with the method of this invention, essentially all unreacted monomer or monomers and other volatile organic compounds can be easily and efficiently removed from a dispersion of polymerizate in an aqueous medium. This is accomplished by circulating the dispersion from the bottom of its container to the upper part of the same container over the surface of the dispersion by means of a conduit exterior to the container, while maintaining the pressure in the container at a level reduced to about the saturated vapor pressure of water at the temperature of the dispersion.

DETAILED DESCRIPTION OF THE INVENTION

This invention is an outcome of extensive research efforts undertaken by the inventors with an aim to overcome the disadvantages encountered in the prior art techniques. According to the findings of the inventors, the removal of the unreacted monomers etc. can be carried out easily and efficiently, within a short period of time. Furthermore, the removal of the unreacted monomers, in accordance with the method of the invention can serve to improve the working environment. In addition, there is an opportunity to recover the removed monomers for the purpose of recycling them into the reactor. Finally, the production of substantially monomer-free polymers provides a significant advancement in the industry. The dispersion of polymerizate in an aqueous medium will hereinafter be referred to as "the dispersion of polymerizate" or simply "the dispersion".

The polymerizate as suitably applied to the method of this invention is a polymerizate produced by the polymerization or copolymerization in an aqueous medium of, for example, vinyl chloride, vinylidene chloride, styrene, methylmethacrylate or vinyl acetate. Particularly suitable is the polymerization of vinyl chloride or vinylidene chloride, or the copolymerization of a mixture containing vinyl chloride or vinylidene chloride as the main component with one or more of copolymerizable monomers in an aqueous medium.

According to the method of the invention, it is preferable to maintain the dispersion of polymerizate at an elevated temperature. A suitable temperature may be determined depending on the monomer or monomers to be separated. It should advantageously be in the range of from 60° to 90° C when the monomer is vinyl chloride or vinylidene chloride. If the temperature is lower than 60° C, the removal operation will take a longer time. If it is higher than 90° C, the resulting polymer product, viz., polyvinyl chloride or polyvinylidene chloride, exhibits discoloration which is indicative of inferior quality.

The dispersion of polymerizate maintained at the temperature described above is withdrawn from the bottom of the container (e.g., polymerization reactor), and then circulated to the upper part of the same container over the surface of the dispersion by means of a conduit exterior to the container. This is accomplished by means of a circulating pump which preferably pumps the dispersion until the total volume circulated is at least equal to the initial volume of the dispersion within the container. The preferred operating time is from 5 to 30 minutes. If a smaller amount is circulated, this will cause a reduction in the beneficial effects achieved by the present method.

The container in which the dispersion of polymerizate is stored may advantageously be the reactor in which the polymerization is completed. Alternatively, the container may be a dump tank into which the dispersion is discharged from the reactor.

The pressure in the container should be reduced to a level as low as possible. In any event, the pressure should not exceed about 1.6 times the saturated vapor pressure of water measured at the temperature of the dispersion. For example, when the dispersion temperature is between about 65° C and about 85° C, the reduced pressure is between 100 mmHg. and 500 mmHg.

If a higher pressure is used, the process will not produce the desired results.

Usually in the polymerization of vinyl chloride or vinylidene chloride in an aqueous medium, there are added initiators, suspending agents, emulsifiers, chain transfer agents, polymerization inhibitors and other additives, accompanied by volatile organic compounds, such as solvents. Those volatile organic compounds remaining in the resulting dispersion of polymerizate can easily be separated and removed together with the unreacted monomer or monomers.

Thus, in accordance with the method of this invention, the volatile organic compounds as well as the unreacted monomer or monomers can be removed from the dispersion of polymerizate with a high degree of efficiency. Therefore, the monomers and other volatile organic compounds are prevented from contaminating the surrounding environment during the subsequent drying of the polymerizate. Thus, the working environment of a polymer production plant as well as the quality of the polymer product are greatly improved.

In the accompanying drawing, constituting a part hereof, and in which like-referenced characters indicate like parts, a preferred embodiment is shown which is presented for illustrative purposes only and is not meant to limit the invention in any manner.

The apparatus in accordance with this invention comprises a polymerization reactor 1, an agitator 2 installed within reactor 1, a conduit pipe 3 exterior to reactor 1, including a circulating pump 4, a condenser 5 and a suction pump 6. Reactor 1 may alternatively be any other vessel, such as a dump tank into which the dispersion of polymerizate is discharged after the polymerization is completed.

The dispersion of polymerizate 7 contained in reactor 1 is withdrawn from the bottom of reactor 1 and transferred to the upper part of reactor 1 over the surface of dispersion 7 via conduit 3 by means of circulating pump 4 for circulation, while agitator 2 is preferably operated. At the same time, suction pump 6 is operated to reduce the pressure inside reactor 1 to a predetermined degree for a predetermined time in order to separate the monomer and other volatile organic compounds in the form of vapor. The vaporized substances are then condensed by condenser 5 and finally collected and recovered.

The following specific examples are for illustrative purposes only and are not intended to limit the scope of the present invention in any manner.

EXAMPLE 1

Suspension polymerization of vinyl chloride (VC) was carried out in a conventional manner with the addition of small amounts of methanol which served to indicate the behaviors of a volatile organic compound in the process of the present invention.

Each polymerizate slurry produced by the suspension polymerization of VC contained in a reactor was tested for determination of the amounts of unreacted monomer remaining in the slurry at certain intervals of time in the following fashion in accordance with the method of this invention and by way of control.

The slurry of polymerizate (volume: 100 m$^3$, polymer content: 40% by weight) was withdrawn from the bottom of the reactor, with agitation in operation and transferred to the upper part of the same reactor over the surface of the dispersion via an exterior conduit by means of a circulating pump at the circulation velocity of 5 m$^3$/min. The pressure in the reactor was kept at a reduced level by means of a suction pump. The VC monomer content in the slurry flowing through the exterior conduit was determined at intervals of 5, 10, 15, 20 and 30 minutes. The results are set out in Table I, together with the VC content existing in the slurry just prior to the operation. The pressure and temperature at which the slurry of polymerizate was maintained in the reactor is given in the same table.

Additionally Table I shows the quality of test pieces prepared from the polyvinyl chloride resins produced by dehydration and drying of the slurry of polymerizate taken from the exterior conduit for the purpose of determining the VC content. These were compared to those commercially available in the market with respect to their appearance or color tone. An A rating indicates an average-to-superior quality. A B rating indicates slightly inferior quality, and finally, a C rating indicates a significantly inferior quality.

The test pieces used for the above color tone comparison were prepared by the following procedure. 1 part by weight of tin laurate, 0.5 part of a cadmium stabilizer and 50 parts by weight of dioctyl phthalate were added to 100 parts by weight of dried polyvinyl chloride resin powder, and the mixture was kneaded on a roll mill at 170° C for 5 minutes to form a sheet 160 mm wide and 1 mm thick. The sheet thus obtained was made into chips, and the chips weighing 28 g were put into a mold measuring 40 × 40 × 15 mm. This was followed by heating at 170° C for 7 minutes. The chips were then pressed under a pressure of 250 kg/cm$^2$ at 170° C for 3 minutes, to finally obtain the test pieces.

Table I

| Test No. | | Prior to Operation | (VC content, p.p.m. by weight) Interval of: | | | | | Reduced Pressure (mmHg) | Slurry Temperature (° C) |
| --- | --- | --- | --- | --- | --- | --- | --- | --- | --- |
| | | | 5 minutes | 10 minutes | 15 minutes | 20 minutes | 30 minutes | | |
| 1 | VC content | 5880 | | | | | 4650 | −640 | 65 |
| | Color tone | (A) | | | | | (A) | | |
| 2 | VC content | 6000 | | 4930 | 4250 | | 3920 | −640 | 55 |
| | Color tone | (A) | | (A) | (A) | | (A) | | |
| 3 | VC content | 6030 | 5200 | 3110 | 1750 | 830 | 520 | −560 | 65 |
| | Color tone | (A) | (A) | (A) | (A) | (A) | (A) | | |
| 4 | VC content | 6020 | 3220 | 2050 | 930 | 400 | | −455 | 75 |
| | Color tone | (A) | (A) | (A) | (A) | (A) | | | |
| 5 | VC content | 6000 | 2300 | 1070 | 450 | 140 | | −300 | 85 |
| | Color tone | (A) | (A) | (A) | (A) | (B) | | | |
| 6 | VC content | 5950 | 1830 | 715 | 230 | 95 | | −110 | 95 |
| | Color tone | (A) | (A) | (B) | (C) | (C) | | | |

Notes: (1) Circulation of the slurry was carried out in all tests except Test No. 1.
(2) Tests 1, 2 and 6 were for Control and Tests 3, 4 and 5 were for the present invention.

Further with respect to Tests Nos. 1, 3, 4 and 5, the methanol content of the slurry was determined at each interval. The results are set out in Table II.

With further reference to Test No. 5 a variety of circulation rates was applied and the VC content of the slurry was determined at intervals of 5, 10, 15 and 20 minutes from the start of operation. The results are set out in Table III.

Table II

| | (Methanol content, p.p.m. by weight) | | | | | |
|---|---|---|---|---|---|---|
| | Prior to | Interval of: | | | | |
| Test No. | Operation | 5 min. | 10 min. | 15 min. | 20 min. | 30 min. | Remark |
| 1 | 82 | | | | | 81 | Control |
| 3 | 83 | 78 | 62 | 50 | 38 | 25 | Present Invention |
| 4 | 82 | 73 | 55 | 31 | 18 | | |
| 5 | 82 | 68 | 41 | 28 | 12 | | |

Table III

| | (VC content, p.p.m. by weight) | | | | |
|---|---|---|---|---|---|
| Rate of Circulation ($m^3$/min.) | 0 | 0.5 | 3 | 8 | 15 |
| Prior to Operation | 6000 | 6000 | 6000 | 6000 | 6000 |
| Interval of: | | | | | |
| 5 min. | 4600 | 4500 | 2100 | 1810 | 1520 |
| 10 min. | 4100 | 4050 | 1180 | 920 | 830 |
| 15 min. | 3480 | 3350 | 560 | 350 | 350 |
| 20 min. | 2950 | 2820 | 220 | 140 | 140 |

It is clear from Table I that satisfactory monomer removal cannot be achieved when the slurry temperature is lower than 60° C even with circulation. On the other hand, monomer removal can be advanced as the slurry temperature rises. However, temperatures about 90° C or higher tend to give adverse effects to the quality of the resulting resin products even when the operation time is as short as about 10 minutes.

Further, Table II shows that the operation is effective in the removal of other volatile organic compounds, such as methanol.

From Table III it can be seen that monomer removal is increased as the velocity of circulation is increased. The optimum circulation of the slurry should result in a circulation of about between 1 and 3 times the total volume of the dispersion in the container. A circulation of less than the total volume will result in a considerable decrease of the monomer removal, while circulation more than three times the total volume does not further increase the monomer removal.

EXAMPLE 2

An emulsion (volume: 70 $m^3$) produced by the emulsion polymerization of vinyl chloride (VC) contained in a reactor was tested for determination of the unreacted VC monomer content in the same manner as Example 1. The emulsion was circulated at a temperature of 85° C at a velocity of 5 $m^3$/min. with agaitation for 15 minutes, while the pressure in the reactor was reduced to −320 mmHg. As a result, the VC monomer content was found to be 720 p.p.m., compared to 9,300 p.p.m. as measured prior to the operation.

For the purpose of comparison, the same starting emulsion kept at 70° C was subjected to the same procedure except that circulation was omitted. The resultant emulsion contained the VC monomer in an amount of 9,270 p.p.m. Therefore, it is apparent that there was a very minor reduction in the monomer content absent the circulation procedure of the present invention.

EXAMPLE 3

A polymerizate slurry (Volume: 25 $m^3$) produced by the suspension copolymerization of vinyl chloride and vinylidene chloride contained in a reactor was tested for determination of the unreacted monomer content in the same manner as Example 1. The slurry was circulated at 80° C at a velocity of 2 $m^3$/min. with agitation for varied intervals under a reduced pressure of −380 mmHg. The results are set out in Table IV.

Table IV

| | (Monomer Content, p.p.m. by weight) | | |
|---|---|---|---|
| | Prior to | Interval of: | | |
| | Operation | 5 minutes | 10 minutes | 15 minutes |
| Vinyl chloride | 5980 | 780 | 360 | 135 |
| Vinylidene chloride | 4820 | 1350 | 540 | 220 |

EXAMPLE 4

A polymerizate slurry (volume: 100 $m^3$) produced by the suspension copolymerization of vinyl chloride and vinyl acetate contained in a reactor was tested for determination of the unreacted monomer content in the same manner and conditions as in Test 5 described in Example 1 (Table I). The slurry was circulated at a velocity of 5 $m^3$/min. with agitation under a reduced pressure of −300 mmHg. The results are set out in Table V.

Table V

| | (Monomer content, p.p.m. by weight) | | |
|---|---|---|---|
| | Prior to | Interval of: | |
| | Operation | 10 minutes | 20 minutes |
| Vinyl chloride | 4520 | 315 | 120 |
| Vinyl acetate | 1675 | 630 | 235 |

We claim:

1. In a method for the removal of unreacted monomeric material and any other volatile organic compounds from an aqueous dispersion of polymerizate produced by the polymerization of vinyl chloride or a mixture thereof with a copolymerizable monomer or monomers in an aqueous medium and contained in a container the improvement comprising the steps of circulating the aqueous dispersion after completion of polymerization from the bottom of the container to the upper part of the container by way of an exterior conduit, agitating the aqueous dispersion during the step of circulating the dispersion, discharging the circulated dispersion, above the surface of the aqueous dispersion in said container and simultaneously maintaining the aqueous dispersion at a temperature of from 60° C. to 90° C. under a pressure of between about 1.0 and 1.6 times the saturated vapor pressure of water at the temperature of the aqueous dispersion.

2. The method as claimed in claim 1 wherein the circulation of the aqueous dispersion is continued until an amount of said circulated dispersion at least equal to the whole volume of the dispersion in said container has been moved through said exterior conduit.

3. In a method for the removal of unreacted monomeric material and any other volatile organic compounds from an aqueous dispersion of polymerizate produced by the polymerization of vinyl chloride or a mixture thereof with a copolymerizable monomer or monomers in an aqueous medium and contained in a container the improvement comprising the steps of circulating the aqueous dispersion after completion of polymerization from the bottom of the container to the upper part of the container by way of an exterior conduit, discharging the circulated dispersion above the surface of the aqueous dispersion in said container and simultaneously maintaining the aqueous dispersion at a temperature of from 60° C. to 90° C. under a pressure of between about 1.0 and 1.6 times the saturated vapor pressure of water at the temperature of the aqueous dispersion.

4. The method as claimed in claim 3 wherein the circulation of the aqueous dispersion is continued until an amount of said circulated dispersion at least equal to the whole volume of the dispersion in said container has been moved through said exterior conduit.

* * * * *